(12) United States Patent
Basa et al.

(10) Patent No.: US 12,514,334 B2
(45) Date of Patent: Jan. 6, 2026

(54) LIGHTWEIGHT KNITTED UPPER AND METHODS OF MANUFACTURE

(71) Applicant: NIKE, Inc., Beaverton, OR (US)

(72) Inventors: Shannon J. Basa, Portland, OR (US); Torrey J. Bell, Portland, OR (US); Christina G. Cato, Beaverton, OR (US); Lauren E. Durrell, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 1131 days.

(21) Appl. No.: 16/840,888

(22) Filed: Apr. 6, 2020

(65) Prior Publication Data

US 2020/0329816 A1    Oct. 22, 2020

Related U.S. Application Data

(60) Provisional application No. 62/835,175, filed on Apr. 17, 2019.

(51) Int. Cl.
| | |
|---|---|
| *A43B 23/02* | (2006.01) |
| *B29D 35/00* | (2010.01) |
| *B32B 5/02* | (2006.01) |
| *B32B 27/12* | (2006.01) |
| *B32B 27/40* | (2006.01) |

(52) U.S. Cl.
CPC ............ *A43B 23/025* (2013.01); *B29D 35/00* (2013.01); *B32B 5/026* (2013.01); *B32B 27/12* (2013.01); *B32B 27/40* (2013.01); *B32B 2262/132* (2021.05); *B32B 2437/02* (2013.01)

(58) Field of Classification Search
CPC ......... A32B 23/05; B32B 5/026; B32B 27/12; B32B 27/40

USPC ......................................................... 442/310
See application file for complete search history.

(56) References Cited

U.S. PATENT DOCUMENTS

| | | | | |
|---|---|---|---|---|
| 7,842,628 | B2* | 11/2010 | Yasui | A41B 17/00 442/310 |
| 8,595,878 | B2 | 12/2013 | Huffa et al. | |
| 8,997,530 | B1* | 4/2015 | Podhajny | D04B 1/24 36/47 |
| 2004/0118018 | A1* | 6/2004 | Dua | A43B 1/14 36/3 A |

(Continued)

FOREIGN PATENT DOCUMENTS

| | | |
|---|---|---|
| CN | 1715474 A | 1/2006 |
| CN | 104106883 A | 10/2014 |

(Continued)

OTHER PUBLICATIONS

International Search Report and Written Opinion for PCT/US2020/026896, mailed Sep. 29, 2020, 20 pages.

(Continued)

*Primary Examiner* — Vincent Tatesure
(74) *Attorney, Agent, or Firm* — Shook, Hardy & Bacon L.L.P.

(57) ABSTRACT

A lightweight, breathable and high-strength upper formed from a half-gauge knit or lesser gauge knit, at least in part from alternating courses of a first monofilament and a second multifilament yarn, is described. The upper may include a skin layer. Methods of manufacture of an article of footwear including the lightweight upper are also described.

25 Claims, 6 Drawing Sheets

(56) References Cited

U.S. PATENT DOCUMENTS

| | | |
|---|---|---|
| 2013/0145652 A1 | 6/2013 | Podhajny et al. |
| 2016/0353834 A1* | 12/2016 | Luedecke ............ A43B 13/122 |
| 2019/0037966 A1 | 2/2019 | Aceves Tinajero et al. |
| 2019/0037968 A1* | 2/2019 | DeWillie ................ A43C 1/02 |
| 2020/0046074 A1 | 2/2020 | Berrian et al. |
| 2020/0297069 A1 | 9/2020 | Bell et al. |

FOREIGN PATENT DOCUMENTS

| | | | |
|---|---|---|---|
| CN | 104911796 A | 9/2015 | |
| CN | 107217377 A | 9/2017 | |
| CN | 207341288 U | 5/2018 | |
| EP | 0518582 A2 | 12/1992 | |
| EP | 2792264 A2 * | 10/2014 | .............. A43B 1/00 |
| EP | 2835460 A1 | 2/2015 | |
| WO | WO-2018031616 A1 * | 2/2018 | .............. A43B 1/04 |

OTHER PUBLICATIONS

International Preliminary Report on Patentability received for PCT Patent Application No. PCT/US2020/026896, mailed on Oct. 28, 2021, 13 pages.

Office Action received for European Patent Application No. 20722137.5 mailed on Mar. 23, 2023, 10 pages.

* cited by examiner

LIGHTWEIGHT KNITTED UPPER AND METHODS OF MANUFACTURE

RELATED APPLICATIONS

The present application claims the benefit of the filing date under 35 U.S.C. § 119(e) of Provisional U.S. Patent Application Ser. No. 62/835,175, filed Apr. 17, 2019, the entirety of which is hereby incorporated by reference.

BACKGROUND

A variety of articles are formed from textiles. As examples, articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats) are often at least partially formed from textiles. These textiles are often formed by weaving or interlooping (e.g., knitting) a yarn or a plurality of yarns, usually through a mechanical process involving looms or knitting machines. One particular object that may be formed from a textile is an upper for an article of footwear.

Conventional articles of footwear generally include two primary elements: an upper and a sole structure. The upper is secured to the sole structure and forms a void within the article of footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole may be secured to a lower surface of the midsole and forms a ground-engaging portion of the sole structure that is formed from a durable and wear-resistant material.

The upper of the article of footwear generally extends over the instep and toe areas of the foot, along the medial and lateral sides of the foot, and around the heel area of the foot. In some cases, the upper may extend at least partially underfoot. Access to the void on the interior of the upper is generally provided by an ankle opening in a heel area of the footwear. A lacing system is often incorporated into the upper to adjust the fit of the upper, thereby facilitating entry and removal of the foot from the void within the upper. The upper may include a tongue that extends under the lacing system to enhance adjustability of the footwear, and the upper may incorporate a heel counter to limit movement of the heel.

DESCRIPTION OF THE DRAWINGS

The embodiments will be further described in connection with the attached drawings. It is intended that the drawings included as a part of this specification be illustrative of the exemplary embodiments and should in no way be considered as a limitation on the scope of the present disclosure. Indeed, the present disclosure specifically contemplates other embodiments not illustrated but intended to be included in the claims.

DETAILED DESCRIPTION

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to articles at least partially formed from textiles. One example of an article is an article of apparel (e.g., shirts, pants, socks, footwear, jackets and other outerwear, briefs and other undergarments, hats and other headwear, or the like). The article may be an upper configured for use in an article of footwear. Illustrative, non-limiting examples of articles of footwear include a basketball shoe, a biking shoe, a cross-training shoe, a global football (soccer) shoe, an American football shoe, a bowling shoe, a golf shoe, a hiking shoe, a ski or snowboarding boot, a tennis shoe, a running shoe, and a walking shoe. The upper may also be incorporated into a non-athletic shoe, such as a dress shoe, a loafer, and a sandal.

In one example, an upper for an article of footwear is described. The upper may include a knitted component extending through a forefoot region, a midfoot region, and a heel region of the article of footwear. At least a portion of the knitted component may include a half-gauge knit or lesser gauge knit formed from alternating courses of a first monofilament and a second multifilament yarn having a tenacity of at least about 5 g per denier or greater.

In another example, an article of footwear having an upper and a sole structure secured to the upper is described. The upper may include a knitted component extending through a forefoot region, a midfoot region, and a heel region of the article of footwear. At least a portion of the knitted component may include a half-gauge knit or lesser gauge knit formed from alternating courses of a first monofilament and a second multifilament yarn. The knitted component may have a basis weight of at least about 2 g to about 5 g per a 5 in.×5 in. swatch of the knitted component.

In yet another example, a method is described. The method may include knitting a knitted component configured to form at least a portion of an upper of an article of footwear, where the knitted component may include a half-gauge knit or lesser gauge knit formed at least in part from alternating courses of a first monofilament and a second yarn. The second yarn may have a tenacity of at least about 5 g per denier or greater. The method may further include securing the knitted component to a jig. The method may further include exposing the knitted component to a heat stimulus. The method may further include removing the knitted component from the jig. The method may further include manipulating the knitted component to form a shape of the upper of the article of footwear. The method may further include applying a skin to at least a portion of the knitted component.

Referring to FIGS. 1-4, an article of footwear 100 may include an upper 102 secured to a sole structure 104. The upper 102 may include a lateral side 106 and a medial side 108. The area of the shoe where the sole structure 104 joins the upper 102 may be referred to as the biteline 110. The upper 102 may be joined to the sole structure 104 in a fixed manner using any suitable technique, such as through the use of an adhesive, by sewing, etc. It is contemplated that the upper 102 may extend partially or completely around the foot of a wearer, may extend under the foot of a wearer, and/or may be integral with the sole, and a sockliner may or may not be used. In some embodiments, the sole structure 104 may include a midsole (not shown) and an outsole.

The article of footwear 100 may additionally include a throat area 112, a collar 116, and an ankle opening 114, which may lead to a void 118. The void 118 of the article of footwear 100 may be configured to accommodate a foot of a person. The throat area 112 may be generally disposed in a midfoot area 120 of the upper 102. The midfoot area 120 is generally an area of the upper 102 located between a heel area 122 and a forefoot area 124. In some embodiments, a tongue may be disposed in the throat area 112, but a tongue is an optional component. The tongue may be any type of tongue, such as a gusseted tongue or a burrito tongue. The article of footwear shown in FIGS. 1 and 2 preferably includes a tongue that is integrally formed with the upper in the throat area 112, such that the upper and the tongue are one piece and formed seamlessly as a single unitary one-piece component during the knitting process and no separate attachment of a tongue component is necessary. However, in an embodiment where a tongue is not included, a tongue may be separately formed and later joined to the upper such as by adhesives, bonding and/or stitching, or, in yet another embodiment where no tongue is included, the lateral and medial sides of the throat area 112 may be joined together.

At least a portion of the upper 102, and in some embodiments substantially the entirety of the upper 102, and in still further embodiments the entire upper, may be formed of at least one knitted component 132, such as by a weft-knitting process or a warp-knitting process on a flat knitting machine, for example. Additional elements, such as an underfoot portion and/or a heel element 134 (including, but not limited to a heel counter or other elements or components) may be integrally formed with the upper 102 as a one-piece unitary structure, or, alternatively, one or more such additional elements may be formed separately from the upper 102 and then later attached, secured or otherwise assembled as necessary.

The knitted component 132 may have a first side 130 forming an inner surface of the upper 102 (e.g., facing the void 118 of the article of footwear) and a second side 138 forming an outer surface of the upper 102 (e.g., facing generally opposite the first side 130). The first side 130 and the second side 138 of the knitted component 132 may exhibit different characteristics (e.g., breathability, abrasion resistance, strength, structure and comfort, among other advantageous characteristics mentioned herein). As previously mentioned, the knitted component 132 may be formed as a single integral one-piece element during a knitting process, such as a weft knitting process (e.g., with a flat knitting machine or circular knitting machine), a warp knitting process, or any other suitable knitting process. That is, the knitting process on the knitting machine may substantially form the knit structure of the knitted component 132 without the need for significant post-knitting processes or steps. Alternatively, two or more portions of the knitted component 132 may be formed separately as distinct integral one-piece elements and then the respective elements attached. For example, the heel element 134 can be knitted separately from the upper 102 and then attached or secured to the upper 102 by adhesives, stitching, bonding or other mechanisms or a combination thereof.

Forming the upper 102 with the knitted component 132 may provide the upper 102 with advantageous characteristics including, but not limited to, a particular degree of elasticity, breathability, bendability, strength, moisture absorption, weight, abrasion resistance, and/or a combination thereof. In one example, it may be desirable to provide a knitted upper that is lightweight, while also breathable, durable, at least partially translucent and of high strength and containment. These characteristics may be accomplished by selecting a particular single layer or multi-layer knit structure (e.g., a ribbed knit structure, a single jersey knit structure, or a double jersey knit structure), by varying the size and tension of the knit structure, by using at least one monofilament strand and/or a yarn formed of a particular material (e.g., a polyester material, a relatively inelastic material, or a relatively elastic material such as spandex or elastane), by selecting yarns of a particular size (e.g., denier), a particular tenacity, and/or a combination thereof. The knitted component 132 may also provide desirable aesthetic characteristics by incorporating monofilament strands and/or yarns having different colors, reflectivity, textures, various degrees of transparency or translucency or other visual properties arranged in a particular pattern.

The monofilament strands and/or yarns themselves and/or the knit structure formed by at least one monofilament strand and/or at least one yarn of the knitted component 132 may be varied at different locations such that the knitted component 132 has two or more portions with different properties. In one non-limiting example, at least a portion of the knitted component 132 may be formed by at least one monofilament strand and/or a yarn and/or by a particular knitting technique to provide an upper 102 that is relatively lightweight, having relatively high strength and containment and also breathable. Other areas of the upper 102 formed by the knitted component 132 may be formed by at least one different monofilament strand and/or yarn and/or formed by different knitting techniques that results in a portion of the upper 102 that has different characteristics.

For example, the monofilament strands and/or yarns and/or the knitting techniques used to form the throat area 112 and/or the ankle opening 114 may be selected to provide relatively greater elasticity, soft hand, cushioning, enhanced comfort and moisture wicking properties to those regions, while at least a portion of the heel area, midfoot area and/or forefoot area 124 may be formed by one or more monofilament strands or other yarns to provide increased strength, abrasion resistance and/or moisture resistance, for example.

The knitted component 132 may include at least one monofilament strand 150 formed of a first thermoplastic polymer material (e.g., polyurethanes, polyamides, polyolefins, and nylons). A monofilament strand or yarn formed of a thermoplastic polymer material may transition from a solid state to a softened or liquid state when subjected to certain temperatures at or above its melting point and then transition back to the solid state when cooled. In one example, the monofilament strand 150, which may be referred to herein as "A405 2.0" monofilament strands, are available from Nova Leather Company. However, it is also contemplated that any one or more types of monofilament strands may be used that are similar to or different from monofilament strand 150, whether they are available commercially or sourced internally from one or more of applicant's own proprietary monofilament strands or other similar materials. The monofilament strand 150 may be a 0.20 mm monofilament that is a co-extruded yarn with a nylon core and a TPU sheath, such that it is about 60% nylon and 40% TPU. The monofilament strand 150 may have an approximate denier of about 350 and an average tensile strength of about 1.17 Kgf. In one example, the average elongation may be about 88.65%.

The monofilament strand 150 described herein may have a relatively high melting temperature. In one example, the monofilament strand 150 may have a melting temperature above about 100 degrees Celsius, or above about 120 degrees Celsius, or above about 170 degrees Celsius or above about 200 degrees Celsius. In an exemplary embodiment, the monofilament strand 150 may begin to flatten and mold if heated and pressed under pressure at about 130 degrees Celsius, and may have a true melt point of about 175 degrees Celsius. These relatively high melting temperatures of the monofilament strand 150 may be suitable for and tolerant to heat-processing procedures that do not burn, scorch, melt, or otherwise compromise other materials in the knitted component when it is heated to the heat-processing temperature.

In other words, the relatively high melting temperature of the monofilament strand 150 may allow it to remain stable, such that it does not melt to a softened or liquid state when exposed to heat processing below its melting temperature, has little shrinkage and little stretch. In one non-limiting example, this exposure to heat processing may include heating the knitted component 132 during a post-processing method, such as steaming, and then placing the knitted component 132 on a last or other similar device such that the knitted component 132 is shaped into a three-dimensional structure that generally conforms to the shape of an upper of an article of footwear. It may also be noted that when knitted and heat processed, the monofilament strand 150 may have a trend of increased average Mullen Burst strength as well as Stoll abrasion (e.g., Stoll abrasion being a test of a material that is abraded until it breaks, where the score is the number of cycles the fabric/textile endures before breaking) when compared to samples that did not undergo heat processing.

The knitted component 132 may also include at least one second yarn 144. In one non-limiting example, a second yarn 144 may include a multifilament yarn or a monofilament. As described herein, the second yarn 144 may be a multifilament high tenacity yarn. For example, a yarn that may be considered as having an average tenacity may be about 3-4 grams per denier, and more specifically, about 3.8 grams per denier. One example of an "average" tenacity yarn may be a polyester yarn, sometimes referred to as "P16" provided by Unifi of North Carolina. This "average" tenacity "P16" polyester yarn may also have a tensile strength of about 0.62 kilogram-force (Kgf). In comparison, a high tenacity yarn may thus have a relatively higher tenacity that may be at least about 5 grams per denier and even more preferably about 6-7 grams per denier, and more specifically, about 6.5 grams per denier. The high tenacity yarn (which may be the second yarn 144) may comprise a polyester yarn formed from polyethylene terephthalate (PET), and in one example, the second yarn 144 may be a polyester yarn provided by Unifi (e.g., Unifi High Tenacity). The second yarn 144 may have a tensile strength of about 2.0 kilogram-force.

In one example, at least one end of the second yarn 144 (e.g., a high tenacity polyester yarn) may be used to form one or more courses of the knitted component 132. In another example, two ends of the second yarn 144 may be used to form one or more courses of the knitted component 132, and in still other examples, three or more ends of the second yarn 144 may be used to form one or more courses of the knitted component 132. In one embodiment, three ends of the second yarn 144, (e.g., three ends of 300 denier high tenacity polyester yarn) may be used to form one or more courses of the knitted component 132.

It is also contemplated that the second yarn 144 may comprise one or more other types of yarn, including a monofilament strand that is different from the monofilament strand 150. Alternatively, the second yarn 144 may comprise other multi-filament yarns formed of a thermoplastic material or the second yarn 144 may be a relatively highly elasticated yarn or thermoset yarn, such as cotton or wool multi-filament yarns. The second yarn 144 may be selected to impart any one or more specific desirable advantageous properties, such as elasticity, tenacity, strength, durability, melting temperature or decomposition temperature and the like.

The second yarn 144 may be translucent or at least partially transparent in some embodiments. This may allow one or more images, elements, symbols, logos or other objects that are behind portions of the knitted component 132 formed at least in part from the second yarn 144, (such as images or elements that are adjacent to the inner surface or first side 130 of the upper 102 and/or within the void 118 formed by the upper 102, to be visible from the second side 138 or exterior of the upper 102. This may enhance the visual properties and/or aesthetic appearance of the upper 102, for example. It will be recognized that more or fewer ends of the second yarn 144, having lower or higher tenacity and/or lower or higher denier, may be used as one of skill in the art would recognize to achieve the desired and necessary properties.

It is noted that the use of at least one relatively high tenacity yarn, such as the second yarn 144 (e.g., a high tenacity polyester yarn), may provide the advantage of an upper 102 having relatively high strength and containment (e.g., "lock out" and containment of a wearer's foot) even when knit as a relatively less dense, lightweight, single layer, half-gauge structure using every other needle and/or a lesser gauge structure (e.g., a third gauge knit, knitting on every third needle, or a quarter gauge knit, knitting on every fourth needle, as compared to a more densely knit structure formed as a "full gauge knit" using every needle of a needle bed).

Figure 1:
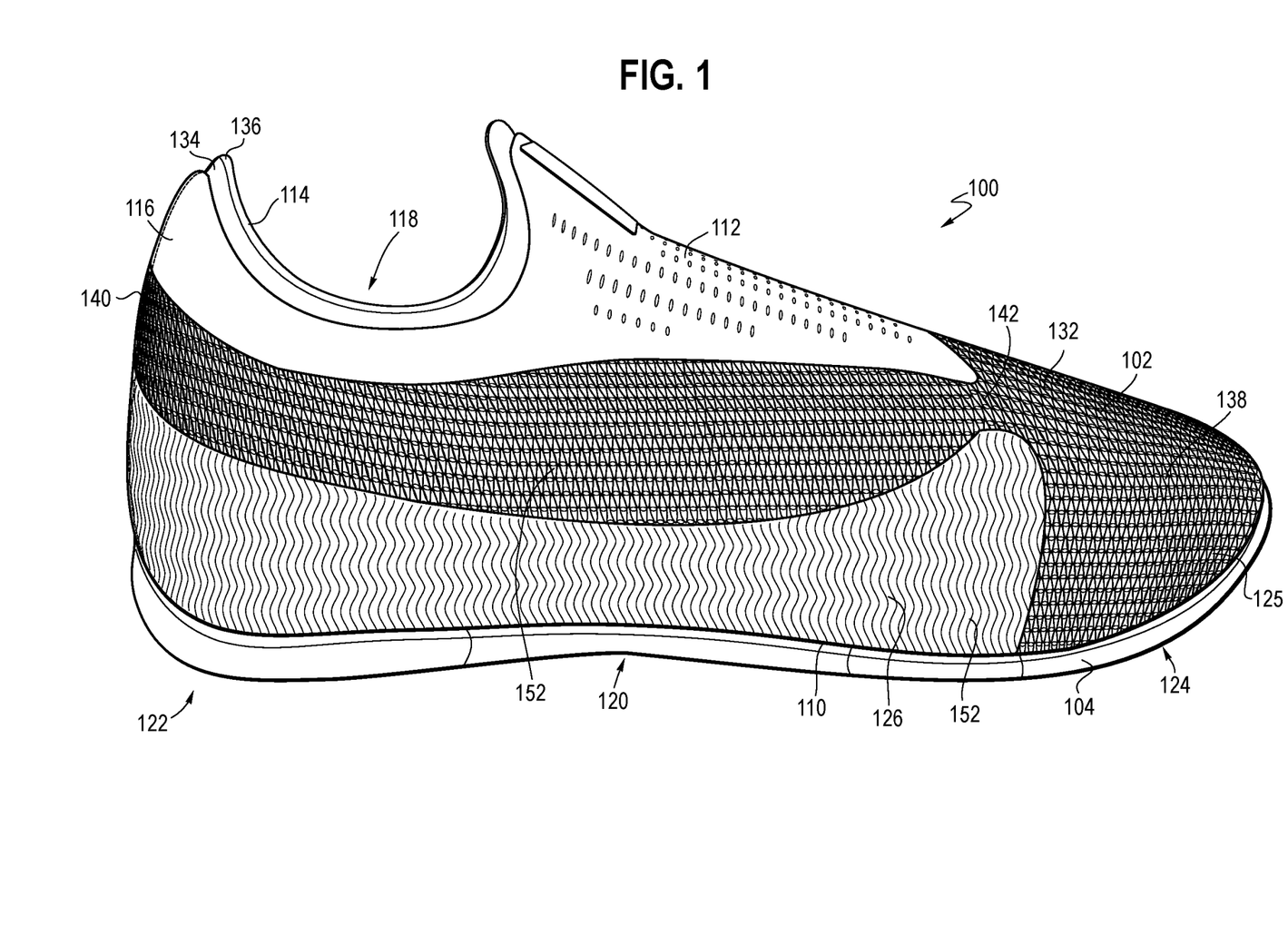
FIG. 1 is an illustration showing a side view of one embodiment of an article of footwear including a knitted component and a skin layer in accordance with certain aspects of the present disclosure.
Figure 3:
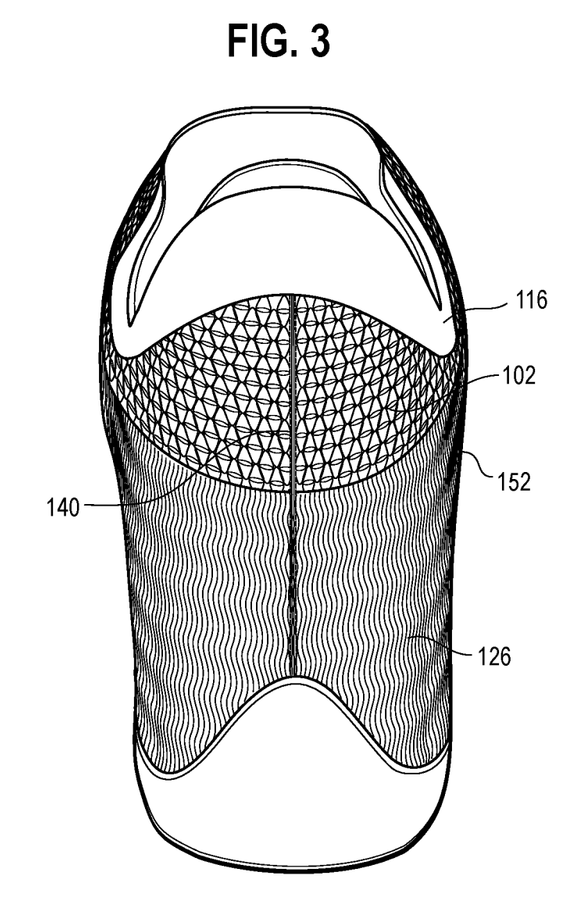
FIG. 3 is an illustration showing a back view of the article of footwear of FIG. 1 in accordance with certain aspects of the present disclosure.

The knitted component 132 may include a seamless portion extending from a toe area 125 of the forefoot area 124, through a midfoot area 120, and to a heel area 122 on at least one of a lateral side 106 and a medial side 108 of the upper. In some embodiments, the knitted component 132 may include a first edge and a second edge, which may be terminal ends of the knitted component 132 after the knitting process when the knitted component 132 is removed from the knitting machine. After the knitting process, the knitted component 132 may be folded or otherwise manipulated such that the first edge and the second edge are secured together at a seam 140 during formation of the upper 102. The seam 140 may be located on the lateral side 106 of the upper 102, on the medial side 108 of the upper 102, in the underfoot portion of the upper 102 (not shown), and/or in another location (e.g., at the back of the heel area 122 of the upper as shown in FIGS. 1 and 3). Forming the upper 102 such that it is in an appropriate shape for inclusion in an article of footwear 100 may further include lasting the upper 102. An example of a lasting process is described in U.S. patent application Ser. No. 12/848,352, filed Aug. 2, 2010, and issued as U.S. Pat. No. 8,595,878, which is herein incorporated by reference in its entirety.

Connecting the first edge and the second edge may include sewing, adhesive bonding, heat bonding, welding, using a mechanical clamp, or any other suitable device or method, and it is contemplated that another device or structure or element may be placed between the first edge and the second edge. The folding/manipulating step, and/or the step of forming the seam 140, may be at least partially performed when the knitted component 132 is located on a last (not shown).

Figure 2:
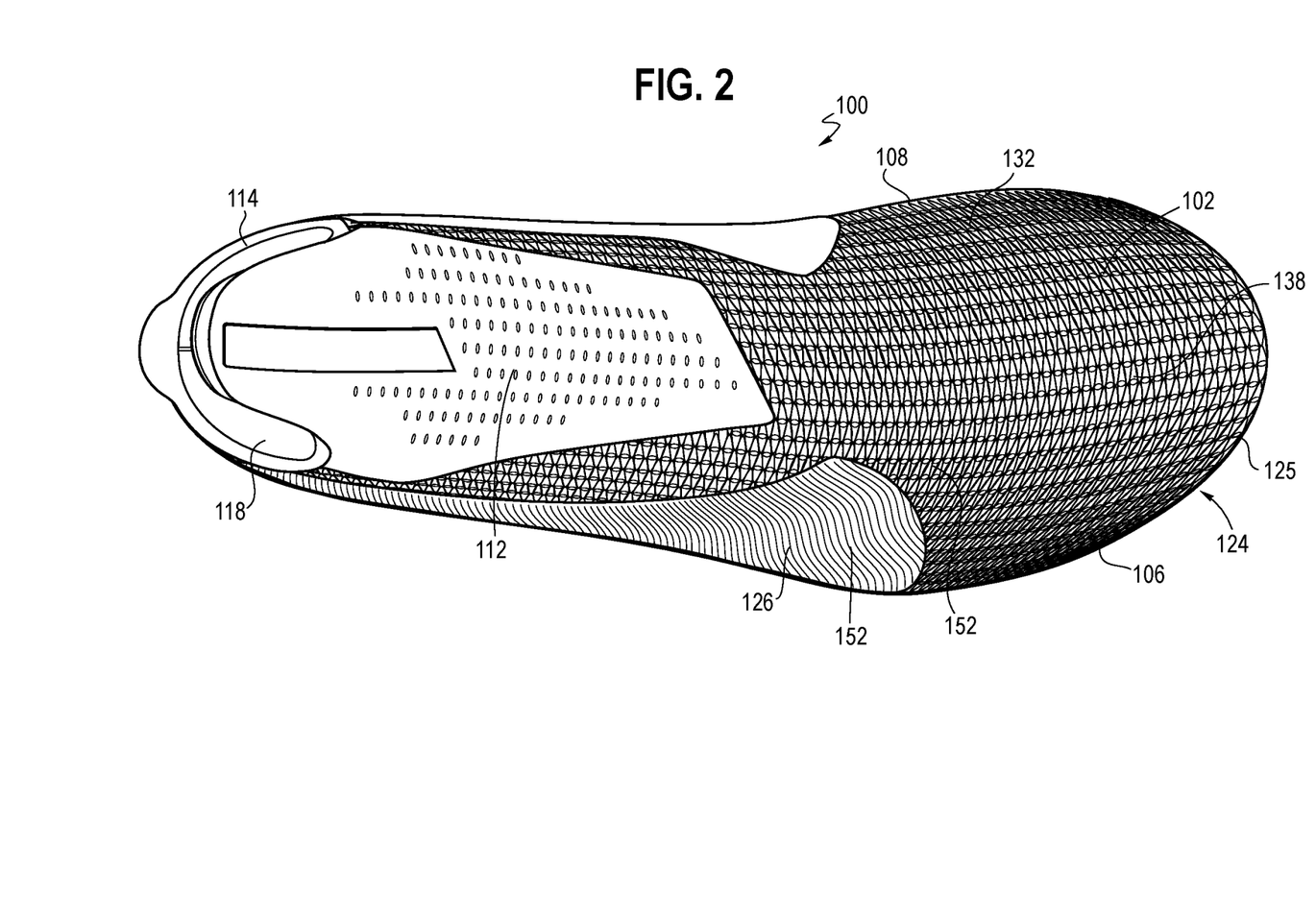
FIG. 2 is an illustration showing a top view of the article of footwear of FIG. 1 in accordance with certain aspects of the present disclosure.

In some embodiments, as shown in FIGS. 1-3, a skin layer 152 including a second thermoplastic polymer material, may be applied onto at least a portion of the knitted component 132 at desired and/or needed locations when the knitted component 132 is manipulated substantially into its wearable shape. The skin layer 152 may be substantially or entirely formed with a thermoplastic polyurethane having a melting temperature of between about 110 degrees Celsius and about 120 degrees Celsius, such as about 118 degrees Celsius. These temperatures may be suitable for heat-processing procedures that do not burn, scorch, melt, or otherwise compromise the materials in the knitted component 132 when it is heated to the heat-processing temperature. As such, the skin layer 152 may be at least partially melted, fused, molded, cooled, re-melted, re-molded, and cooled through one or multiple cycles.

The skin layer 152 may be formed of a second thermoplastic polymer material with a lower melting temperature than that of the monofilament strand 150 and or the second yarn 144 or any other yarns or materials included with the knitted component 132, such that when the skin layer 152 applied to the knitted component 132 is subjected to a steam and/or heat processing, the knitted component 132 may remain stable, in its normal state and configuration (e.g., not melted or softened or otherwise weakened or deformed), while the skin layer 152 melts and/or softens or otherwise fuses to the knitted component 132. Fusing of the skin to the knitted component 132 may provide the ability to secure different portions of the knitted component 132 together (e.g., securing the first edge and the second edge of the knitted component 132 together) and/or securing other components (e.g., sole structure, images, elements, symbols, logos, placards, emblems, and insignia) to the knitted component 132 through thermal bonding.

As utilized herein, the term "thermal bonding" or variants thereof is defined as a securing technique between two components that involves a softening or melting of a thermoplastic polymer material within at least one of the components such that the components are secured to each other when cooled. Similarly, the term "thermal bond" or variants thereof is defined as the bond, link, or structure that joins two components through a process that involves a softening or melting of a thermoplastic polymer material within at least one of the components such that the components are secured to each other when cooled. The skin layer 152 may also provide the ability to reduce or eliminate the inclusion of fusible yarns in the knitted component 132. The skin may also provide advantageous aesthetic properties to the upper.

It will be appreciated that the skin layer 152 may be applied onto the knitted component 132 at any locations as desired and/or needed in order to fuse or bond different portions of the knitted component 132 together and/or secure other components (e.g., sole structures, images, elements, symbols, logos, placards, emblems, and insignia) to the knitted component 132 at desired and/or needed locations. Examples of the skin layer and the methods of using the skin layer to secure the knitted component 132 and other components (e.g., sole structure) together are described in U.S. patent application Ser. No. 16/361,978, filed Mar. 22, 2019, which is herein incorporated by reference in its entirety.

As shown in FIG. 1, at least a portion of the knitted component 132 forming the upper 102, and more preferably, a majority of (i.e., greater than 50%) or even more preferably a substantial majority (i.e., greater than 75% or more) of the knitted component is formed from the monofilament strand 150 and the second yarn 144. In one embodiment, throat area 112 and/or the collar 116, may be formed from the monofilament strand 150 and the second yarn 144. In another embodiment, however, at least a portion of the throat area 112 and/or the collar 116 may or may not be formed from monofilament strand 150 and the second yarn 144, but rather, may be formed from a different yarn or combination of yarns having a relatively greater elasticity. It is also contemplated, however, that the monofilament strand 150 and/or the second yarn 144 may be present in lieu of, or in combination with another yarn in the throat area 112 and/or the collar 116.

In one non-limiting example, at least a portion of the throat area 112 and/or the collar 116 may be formed of a third yarn 160. The third yarn 160 may be different from the monofilament strand 150 and/or the second yarn 144. In one example, the third yarn 160 used to form at least a portion of the knitted component 132, including, but not limited to the throat area 112 and/or the collar 116 comprises a relatively more elastic yarn than the aforementioned monofilament strand 150 and the second yarn 144. Further, at least a portion of the throat area 112 and/or the collar 116 may be formed using a different knit structure or knitting technique than other parts of the upper 102. For example, at least a portion of the throat area 112 and/or the collar 116 may be formed using two beds of a knitting machine to create an interlocking stitch or double jersey knit stitch. It is also contemplated that the throat area 112 and/or the collar 116 may be formed of other knit structures such as a 1×1 double bed knit stitch, a ribbed structure, a mock mesh knit structure or other known structures as necessary to achieve the desired properties.

In one example, the third yarn 160 may comprise a combination of a polyester yarn with an elastic core. In some embodiments, the third yarn 160 may be referred to as "E04" which may be two strands of textured polyester wrapped around a 210D Spandex core, although other suitable relatively elastic yarns may be used to achieve the necessary properties and characteristics. For example, the third yarn 160 may alternatively comprise a relatively elastic yarn referred to as "E08" which may be two strands of a textured polyester yarn wrapped about an elastic (i.e., a 420D Spandex) core. Other suitable elastic yarns may also include "E06" which may be two strands of textured polyester wrapped around a 140D Spandex core. The combination of materials, such as the polyester yarn and the elastic yarn that together form the third yarn 160 may be achieved by twisting, winding, braiding, and/or wrapping on about the other and the like, and/or the yarns may be a core/sheath configuration, and/or the yarns may be tacked along their length at a plurality of points. As such, the collar 116 and/or throat area 112 of the upper may have a relatively greater stretch than other portions of the upper 102, which may provide ease of entry and removal of a wearer's foot, for example, as well as the ability for the upper 102 to conform to the shape and size of the foot for enhanced fit and comfort.

As previously mentioned, different characteristics and advantageous properties may be imparted to different areas or regions of the upper. This may be accomplished by selecting at least one particular monofilament strand and/or yarn(s) to form different regions of the upper 102. However, this may also be accomplished by selecting a particular knitting technique, selecting single layer or multi-layer knit structure (e.g., a ribbed knit structure, a single jersey knit structure, or a double jersey knit structure), by varying the size and tension of the knit structure, by using at least one monofilament strand and/or a yarn formed of a particular material (e.g., a polyester material, a thermoplastic polymer material, a relatively high tenacity material, a relatively inelastic material, or a relatively elastic material such as spandex, etc.), by selecting monofilament strands and/or yarns of a particular size (e.g., denier), by selecting a particular number of ends of the monofilament strands and yarns, and/or a combination thereof.

Figure 5:
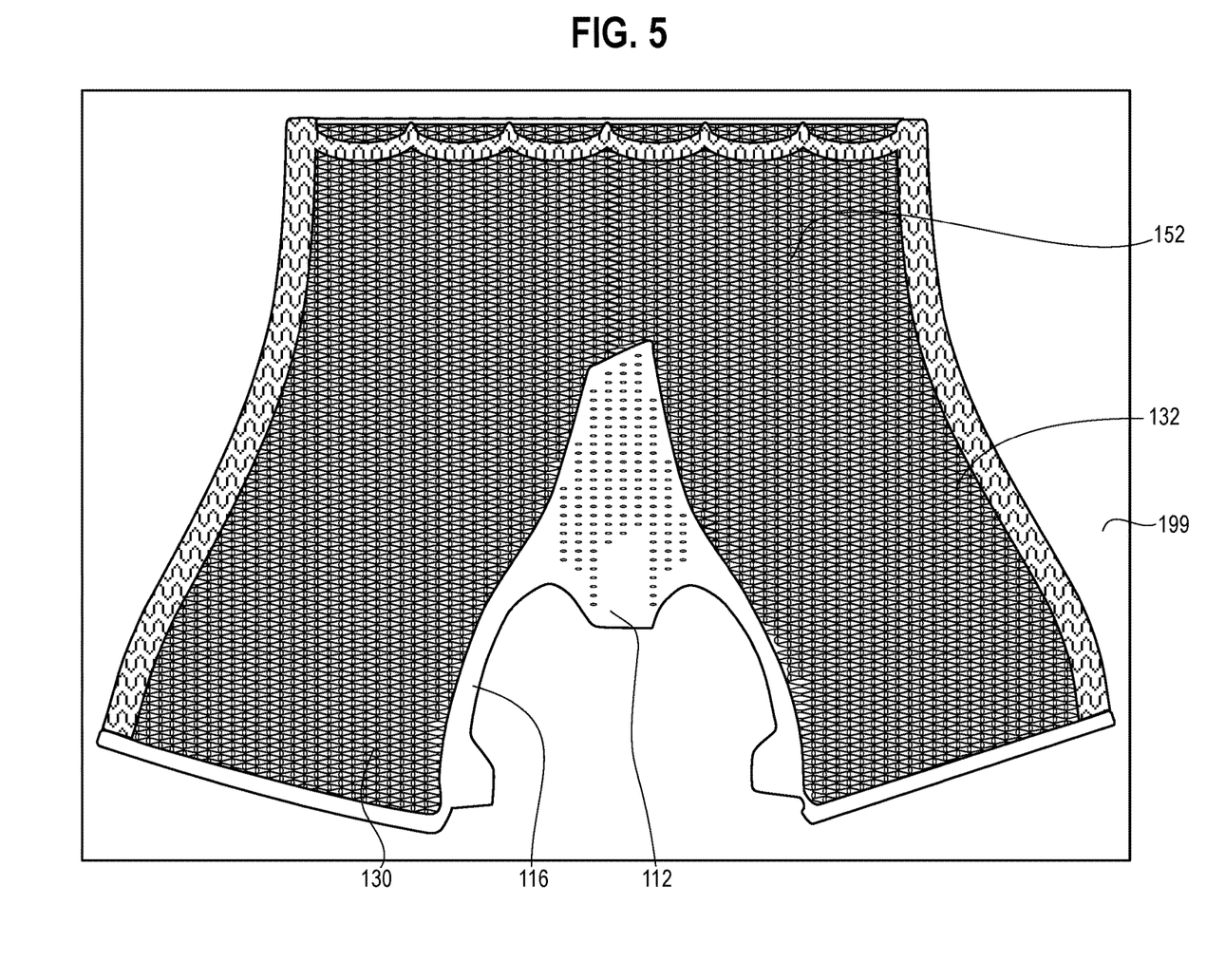
FIG. 5 is an illustration showing the knitted component of FIG. 1 mounted on a jig in accordance with certain aspects of the present disclosure.

In one example, the at least one monofilament strand 150 and the second yarn 144 forming the upper 102 may be knit using a particular knitting technique to achieve a particular knit density, for example, including but not limited to a half-gauge knit on a single needle bed (e.g., knitting on less than every needle, such as knitting on every other needle of a needle bed to form the half-gauge structure). This may include a half-gauge jersey knit as shown in FIGS. 1, 2 and 5, for example. It is also contemplated that the upper 102 may be formed from a lesser gauge knit, including but not limited to a third gauge knit (knitting on every third needle) or quarter gauge knit (knitting on every fourth needle). If necessary or desired, the at least one monofilament strand 150 and/or the second yarn may be knit as a full gauge knit structure (on every needle of the needle bed) or may be knit on two needle beds and formed as a multi-layer structure such as double jersey, in alternative embodiments.

As such, in some embodiments, the entirety or substantially all of the upper 102 may be formed from a half-gauge knit or lesser gauge knit. In other embodiments, certain areas or portions of the upper 102 may have a different stitch density than other portions, such as the throat area 112 and/or the collar 116. For example, certain portions of the upper 102 may have a half-gauge stitch density or less-than a half-gauge stitch density, while the collar 116 and/or throat area 112 may have a greater stitch density. For example, the collar 116 and/or the throat area 112 knit from the third yarn 160 may be formed as a double jersey knit structure on both beds of a double bed knitting machine.

As used in this application, the terms "full gauge," "half gauge," and "less than half gauge," may generally refer to the stitch density of a knit component. Generally, a knit component may include an area having a "full gauge" stitch density if that area contains stitches (e.g., loops or tucks) formed on at least two consecutive needles of a needle bed (often more than two consecutive needles). Similarly, the same knit component may include an area having a "half gauge" stitch density, in which that area contains stitches formed on less than every needle, such as every other needle. Similarly, the same knit component may have "less than full gauge" areas that are neither full gauge nor half gauge, for example one-third gauge (stitches formed on every third needle) or one-quarter gauge (stitches formed on every fourth needle).

The relatively lower density knit structure provided by the half-gauge knitting technique may therefore provide a lightweight, breathable upper. Additionally, the relatively low density of the knit structure of the knitted component 132 may result in the upper 102 being at least partially translucent and/or transparent. This may reveal, display or otherwise show any auxiliary elements or components or other features (such as logos, decorative elements, colors, etc.) that may lie behind or underneath the first side 130 (the inner surface of the knitted component 132) and/or within the void 118.

When forming the knitted component 132, the knitted component 132 may be oriented with respect to a needle bed of a knitting machine such that a feeder of the knitting machine is capable of moving in a single pass (i.e., without changing its feed direction) to knit a first course from the lateral side 106 to the medial side 108 of the knitted component. As such, subsequent courses are formed that are parallel to the first course. In one example, the toe area 125 of the forefoot area 124 of the knitted component 132 may be formed first, followed by the midfoot area 120 of the knitted component 132, and then the heel area 122 of the knitted component 132 (and/or vice versa, such that the knitted component is formed along a y-axis, in a heel-to-toe direction). Alternatively, the knitted component 132 may be oriented with respect to a needle bed of a knitting machine such that a first course is knit in a direction from heel to toe (or toe to heel). As such, when additional courses are formed parallel to the first course, one of the lateral or medial side is formed first, followed by a central portion such as the throat followed by the other of the lateral or medial side. As such, the knitted component is formed along an x-axis, in a side-to-side, or lateral-to-medial direction.

As described in further detail below with reference to the knit diagram shown in FIG. 4A, the upper 102 may be formed by a series of courses of at least one monofilament strand 150 and/or a second yarn 144, the second yarn 144 being different from the at least one monofilament strand 150. In some embodiments, at least a portion of the upper 102 may be formed by alternating courses of the monofilament strand 150 and the second yarn 144. In one example, one knit course comprising at least one end of the monofilament strand 150 may be followed by at least one knit course comprising at least one end of the second yarn 144. In some embodiments, at least a portion of the upper 102 may be formed by alternating courses of at least one end of the monofilament strand 150 and at least two ends of the second yarn 144. In some embodiments, at least a portion of the upper 102 may be formed by alternating courses of at least one end of the monofilament strand 150 and at least three ends of the second yarn 144.

It will be appreciated that the number of the ends of the monofilament strand 150 and the number of the ends of the second yarn 144 in their respective courses may be varied as desired and/or needed to achieve the desired properties, such as weight, breathability, strength, and durability. In one non-limiting example, a first course 184 may be knit with three ends of the second yarn 144. Following the first course 184, a second consecutive course 186 may be formed from one end of the monofilament strand 150. A third consecutive course 188 may be knit with three ends of the second yarn 144, and a fourth consecutive course 190 may be formed from two ends of the monofilament strand 150. This pattern of alternating courses comprising one or more ends of the second yarn 144 and the monofilament strand 150 may be repeated. The knit structure may be formed by knitting or tucking on every other needle of a needle bed, to form an upper 102 having a half-gauge knit structure (or lesser gauge knit structure, where more than one needle is skipped (floated) between knit or tuck stitches).

In this configuration, the upper 102 may have a predetermined and known basis weight. The basis weight may refer to the weight in grams for a specific size of the knitted component 132. In one non-limiting example, a 5 in.×5 in. swatch of the upper 102 may have a basis weight that ranges from about 2 g to about 5 g for a 5 in.×5 in. swatch, and more specifically about 3 g to about 4 g for a 5 in.×5 in. swatch, and even more specifically about 3.5 g for a 5 in.×5 in. swatch. In another example, a knitted component for a single upper 102, (such as for use in a size 11 men's right or left upper) may be about 39.0 grams. The term "about" is specifically defined herein to include the specific value referenced as well as a dimension that is within 5% of the dimension both above and below the dimension.

As mentioned above, other portions of the upper 102, including but not limited to the collar and/or throat area may be knit using a different knit structure using the third yarn 160, including knitting or tucking on every needle of both a first and second needle bed, for example. Other suitable knit structures may also be used when forming the collar and/or throat area of the upper 102.

In some embodiments, at least a portion of the upper 102 (e.g., a portion of the forefoot area 124 of the upper 102) may be formed by a series of courses formed substantially by, or exclusively of, the monofilament strand 150. Alternatively, at least a portion of the upper 102 (e.g., a portion of the forefoot area 124 of the upper 102) may be formed by a series of courses formed substantially by, or exclusively of, the second yarn 144. However, in the embodiment shown in FIG. 1, a portion of the forefoot area 124 may be formed from alternating courses of the monofilament strand 150 and the second yarn 144 using a different knitting pattern or structure than other parts of the upper.

In one example, a portion of the forefoot area 124 may be formed from a series of alternating courses that are formed from the monofilament strand 150 and the second yarn 144. Further, this portion of the forefoot area may be formed by knitting on every needle of a needle bed to form a full-gauge knit, or, alternatively, by knitting on less than every needle of the needle bed, such as knitting on every other needle of a needle bed (floating every needle in between), to form a half-gauge knit structure. In yet another example, more than one needle may be floated in between each knit or tuck stitch. It will be appreciated that the number of the ends of the monofilament strands 150 and/or the number of ends of the second yarn 144 in each consecutive course may be varied as desired and/or needed and may be different among the courses to achieve desired properties, such as strength, stretch and durability.

In one example, a toe area 125 of the forefoot area 124 may be formed by knitting a first course formed of three ends of the second yarn 144 (e.g., a high tenacity yarn) followed by a second course formed by two ends of the monofilament strand 150 (e.g., the A405 monofilament strand). This pattern can be repeated as necessary, by knitting alternating consecutive courses formed of three ends of the second yarn 144 (e.g., a high tenacity yarn) followed by another course formed by knitting two ends of the monofilament strand 150 (e.g., the A405 monofilament). This pattern is reflected in one example by using at least a portion of the pattern shown in FIG. 4A, by knitting a course having the knit structure shown by course 188, followed by knitting a course having the knit structure shown by course 190, followed again with a knit structure shown by course 188, followed again by a knit structure shown by course 190 and repeating this pattern as desired. By forming a toe area 125 (or any other area) of the forefoot area 124 of the upper 102 using these particular yarn selections and knit structure, greater strength, durability and other advantageous properties may be provided in the corresponding areas of the upper 102. When incorporated into an upper of an article of footwear, these courses may be disposed in the toe area 125 of the forefoot area 124, where such enhanced strength and durability is desired in view of this area being a potential "scuff zone" and the frequent contact with other surfaces during wear, such as ball contact during athletic activity.

Figure 4A:
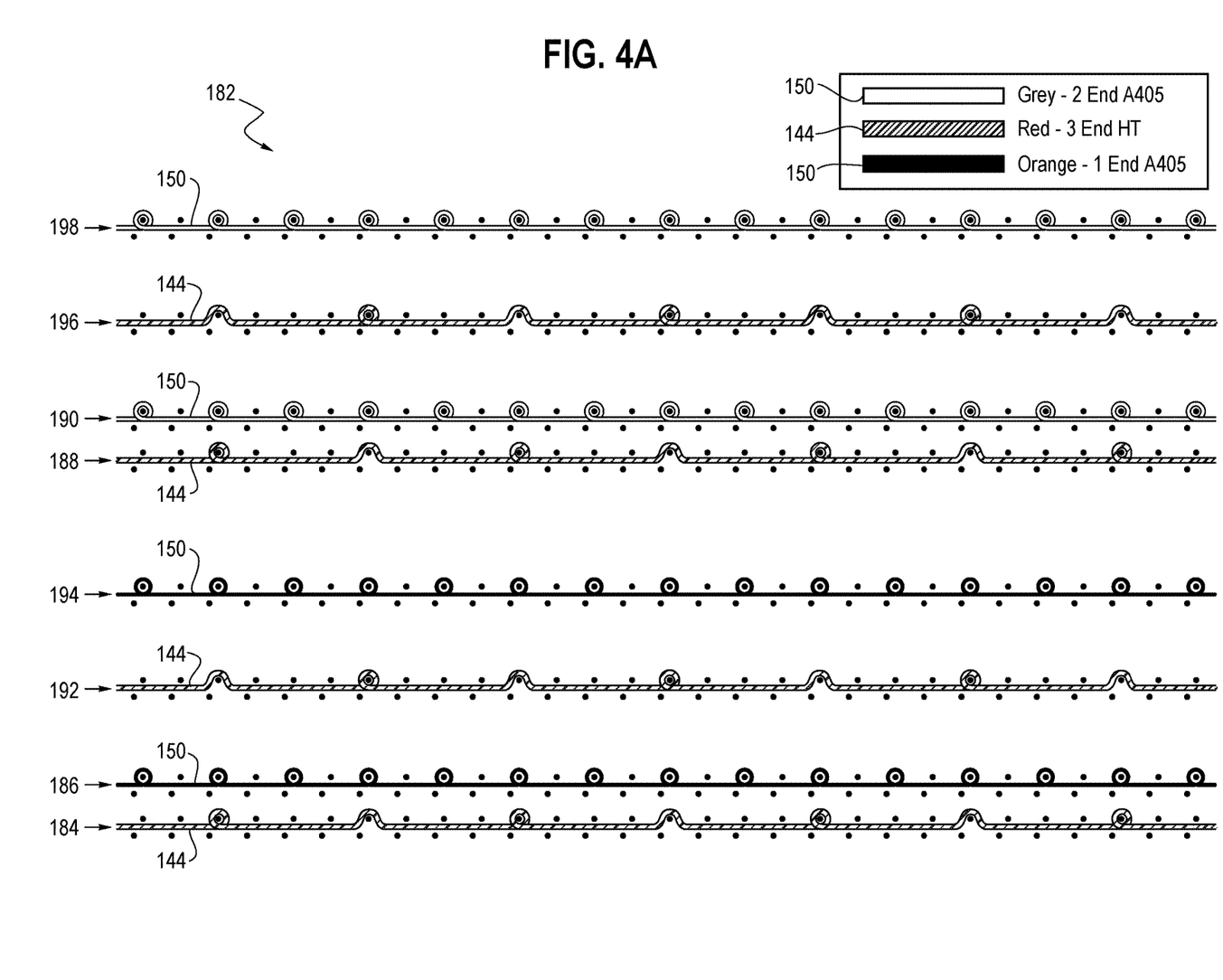
FIG. 4A is a program view of a knitting sequence for forming at least a portion of the knitted component of FIG. 1 in accordance with certain aspects of the present disclosure.

Turning now to FIG. 4A, one example of a knit program 182 used to form at least a portion of the upper 102 will be described. In other words, the knit program 182 described hereinafter forms at least a portion of the upper 102 comprising alternating courses of at least one end of the monofilament strand 150 and at least one end of the second yarn 144.

First, looking to FIG. 4A, one example of a knit program is illustrated. As shown, the knitted component 132 is formed on a knitting machine using a single bed, although it is contemplated that two beds may be used to form at least a portion of the knitted component 132. It can be seen that the at least a portion of the knitted component is formed by knitting or tucking on less than every needle of the needle bed, such as every other needle of the needle bed, and floating needles there between, or in some courses, floating more than one needle in between knit or tuck stitches, thus forming the previously described half-gauge structure. Knitting less than a full-gauge knit (including a half-gauge knit or lesser gauge knit), may result in a relatively lighter weight knitted component. Further, depending on the selection of the particular monofilament strand 150 and/or the particular second yarn 144 (including, for example, the denier, color, translucency or transparency, etc., of the monofilament strand 150 and/or the second yarn 144), as well as the density of the knit structure, the resulting knitted component 132 may comprise an at least partially translucent or transparent upper that is not only relatively lightweight, but also relatively strong and durable and having high containment (or "lock out") due to the use of at least one high tenacity second yarn 144 and/or at least one monofilament strand 150 and/or combinations thereof.

The exemplary knit diagram of FIG. 4A illustrates a first course 184 knit on a single needle bed. In this illustrative example, the first course includes three ends of the second yarn 144. The three ends of the second yarn 144 are knit on a first needle of the needle bed, then three consecutive needles are skipped or floated. The second yarn 144 is then tucked on the next needle, followed by three floated needles, followed by knitting on the next consecutive needle. This pattern is repeated as this first course 184 continues. In other words, the second yarn 144 is either knit or tucked on every fourth needle of the needle bed, while every needle in between is floated (e.g., skipped and not knit on).

A second consecutive course 186 is then knit following the first course 184. The second course 186 is formed by knitting one end of the monofilament strand 150 on every other needle. In other words, the one end of the monofilament strand 150 is knit on every other needle, while floating a single needle in between the knit loops.

A third consecutive course 188 is then knit following the second course 186. The third course 188 is similar to the first course 184, which includes three ends of the second yarn 144. As shown in course 188, three ends of the second yarn 144 are knit on a first needle of the needle bed, then three consecutive needles are skipped or floated. The second yarn 144 is then tucked on the next needle, followed by three floated needles, followed by knitting on the next consecutive needle. This pattern is repeated as this third course 188 continues. In other words, the second yarn 144 is either knit or tucked on every fourth needle of the needle bed, while every needle in between (three in total) is floated (e.g., skipped and not knit on).

A fourth consecutive course 190 is then knit following the third course 188. The fourth course 190 is formed by knitting two ends of the monofilament strand 150 on every other needle. In other words, the two ends of the monofilament strand 150 are knit on every other needle, while floating a single needle in between the knit loops.

A fifth consecutive course 192 is then knit following the fourth course 190. The fifth course 192 comprises three ends of the second yarn 144. The three ends of the second yarn 144 are tucked on a first needle of the needle bed, then three consecutive needles are skipped or floated. The second yarn 144 is then knit on the next consecutive needle, followed by three floated needles, followed by tucking on the next consecutive needle. This pattern is repeated as this fifth course 192 continues. In other words, the second yarn 144 is either knit or tucked on every fourth needle of the needle bed, while every needle in between (three needles in total), are floated (e.g., skipped and not knit on).

A sixth consecutive course 194 is then knit following the fifth course 192. The sixth consecutive course 194 is formed by knitting one end of the monofilament strand 150 on every other needle. In other words, the one end of the monofilament strand 150 is knit on every other needle, while floating a single needle in between the knit loops.

A seventh consecutive course 196 is then knit following the sixth consecutive course 194. The seventh consecutive course 196 comprises three ends of the second yarn 144. The three ends of the second yarn 144 are tucked on a first needle of the needle bed, then three consecutive needles are skipped or floated. The second yarn 144 is then knit on the next consecutive needle, followed by three floated needles, followed by tucking on the next consecutive needle. This pattern is repeated as this seventh consecutive course 196 continues. In other words, the second yarn 144 is either knit or tucked on every fourth needle of the needle bed, while every needle in between (three needles in total), are floated (e.g., skipped and not knit on).

An eighth consecutive course 198 is then knit following the seventh consecutive course 196. The eighth consecutive course 198 is formed by knitting two ends of the monofilament strand 150 on every other needle. In other words, the two ends of the monofilament strand 150 are knit on every other needle, while floating a single needle in between the knit loops.

The above-mentioned pattern may be repeated, where three ends of the second yarn 144 are followed by a course using one end of the monofilament strand 150, followed by a course again using three ends of the second yarn 144, followed by a course comprising two ends of the monofilament strand 150, etc.

As noted above, one or more portions of the upper 102 may be formed from a slightly different knit sequence, including, but not limited to the toe area 125. As mentioned above, the knit sequence used in the toe area 125, or any other area of the upper as desired, may be formed by a course knit from three ends of the second yarn 144, followed by a course knit from two ends of the monofilament strand 150, followed by another course knit from three ends of the second yarn 144, followed again by a course knit from two ends of the monofilament strand 150 and repeating this pattern as necessary.

The knit sequences described above, including the above-described consecutive courses may be repeated, as necessary, to form a knitted component with a suitable size. Further, it is noted that the sequence(s) may be varied to incorporate different features by changing certain knit structures, by varying yarn types, by increasing or decreasing the number of courses at each step, or by any other suitable adjustment to the knitting process or materials used. Further, other sequences may be used before, after, or between the sequences described above.

Further, as previously mentioned, at least a portion of the throat area 112 and/or the collar 116 may be formed using a different knit structure or knitting technique than other parts of the upper 102. For example, at least a portion of the throat area 112 and/or the collar 116 may be formed using two beds of a knitting machine to create an interlocking stitch or double jersey knit stitch. The throat area 112 and/or collar 116 may be formed from the third yarn 160 which may comprise a combination of a polyester yarn with an elastic core, sometimes referred to as "E04" which may be two strands of textured polyester wrapped around a 210D Spandex core, although other suitable elastane yarns may be used to achieve the necessary properties and characteristics. As such, the collar 116 and/or throat area 112 of the upper may have a relatively greater stretch than other portions of the upper 102, which may provide ease of entry and removal of a wearer's foot, for example, as well as the ability for the upper 102 to conform to the shape and size of the foot for enhanced fit and comfort.

Figure 4B:
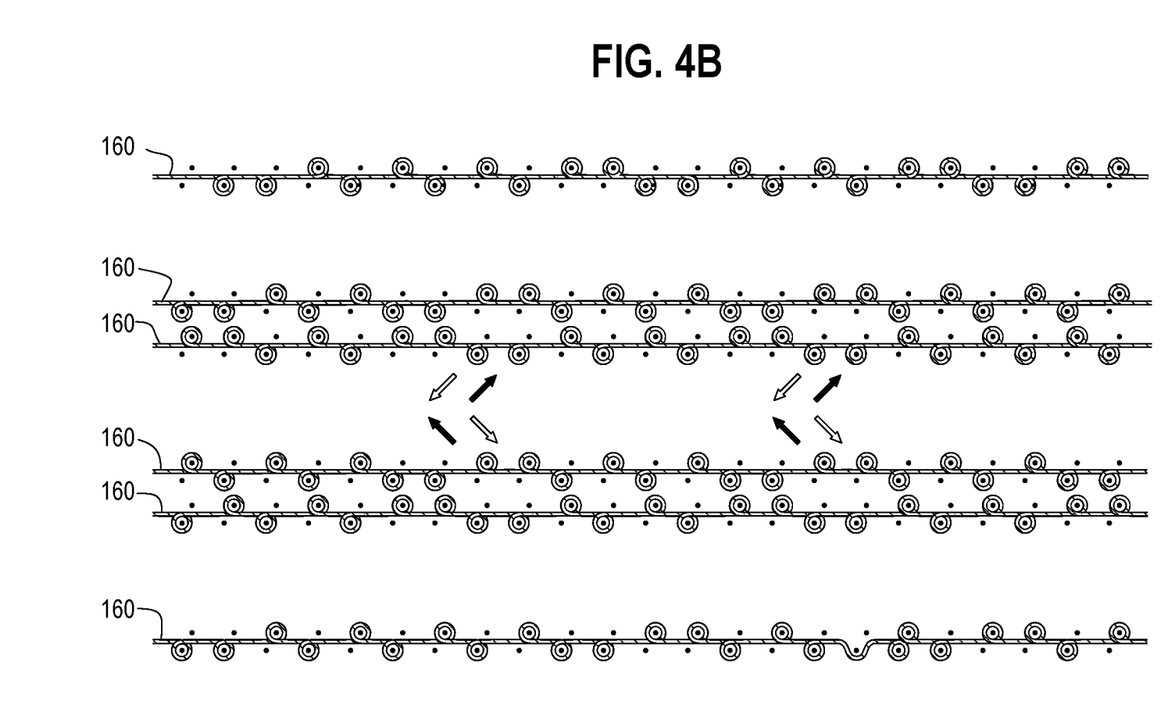
FIG. 4B is a program view of a knitting sequence for forming at least a portion of the collar and/or throat (tongue region) in accordance with certain aspects of the present disclosure.

FIG. 4B illustrates one example of a knit program that may be used to form the throat area 112 and/or the collar 116. As shown there, a first course 202 may be formed by knitting the third yarn 160 on both the front bed and the back bed of a knitting machine. Some needles include a knit stitch while other needles are skipped or "floated" as depicted in FIG. 4B. A second course 204 and a third course 206 are also formed by knitting the third yarn 160 on both the front bed and the back bed of a knitting machine, while floating other needles, as shown. The third yarn 160 may be shifted or transferred over by one or more needles, as shown by the sets of arrows following the third course 206. In one example, the arrows may represent a transfer to another needle to create openings or apertures in the knitted component, including the throat area 112. The stitch is therefore cleared from one needle by moving it to another needle, leaving an opening or aperture behind. A fourth course 208, a fifth course 210 and a sixth course 212 may also be knit to continue to form the throat area 112 and/or the collar 116 with the third yarn 160. However, it will be appreciated that other knit sequences as well as one or more additional or alternative yarns may be used to form the throat area 112 and/or the collar 116, and therefore, the knit program shown in FIG. 4B using the third yarn 160 is merely exemplary.

During or after the knitting process, a stimulus, such as heat, may be applied to at least a portion of, or to the entirety of the knitted component 132. This heat may be in the form of steam, such as by a steam-providing device, for example. One or more effects may result from the exposure of the knitted component 132 to steam.

Referring now to FIG. 5, processing of the knitted component 132 and formation of the upper 102 for an article of footwear are described. After the entirety of the upper 102 is formed (using the knit sequences described above, for example) and further including the throat area 112 and the collar 116, the knitted component 132 may be subjected to one or more post-processing methods. In order to prepare the upper 102 for post-processing methods such as steaming and/or heat pressing, the upper 102 may be secured to a stretching mechanism, securing plate, positioning apparatus or other device. In one example, the device may comprise a jig 199. As shown in FIG. 5, a jig 199 may be used to hold and/or position the upper 102 during the steaming (heat) process. In other processing methods, the jig 199 may be used to hold and/or position the upper 102, or other knitted components (such as the heel element 134) during heating and exposure to pressure, such as by heat pressing. The jig 199 may be a separate element from the device positioning apparatus used for steaming and/or, in the case of a heat press, the jig 199 may be disposed on a bottom plate of a heat press.

The monofilament strand 150 and/or the second yarn 144 (high tenacity yarn) may be selected to have a relatively small denier. As a result, the monofilament strand 150 and/or the second yarn 144 may be knit relatively more densely even when knit as a half-gauge (or lesser) knit structure. As a result, the knitted component 132 may have relatively less stretch and may come off the knitting machine about the same size as the jig 199. Accordingly, there may be no need to remove or eliminate a pre-determined amount of mechanical stretch of the knitted component 132 before it is assembled onto the jig 199. Accordingly, waste may be decreased, manufacturing efficiency may be increased, and manufacturing costs may be reduced. The knitted component 132 may be placed on the jig 199 in its unstretched condition (i.e., the same condition as it comes off the knitted machine without being stretched in any direction) and then be subjected to a predetermined temperature of steam heat for a predetermined period of time. Alternatively, the knitted component 132 may only require a small or negligible amount of mechanical stretch to be removed (i.e., by stretching the knitting component in one or more directions before placing it on the jig 199). The configuration of the jig 199 and methods of using the jig 199 to hold and position the knitted component 132 during steaming and/or heat pressing are described in U.S. Patent Application Ser. No. 62/716,128, filed Aug. 8, 2018, which is herein incorporated by reference in its entirety.

For example, once the knitted component is secured to the jig 199, the knitted component may be subjected to heat, such as steam, to temperatures in the range of about 95 degrees Celsius to about 100 degrees Celsius for about 20-30 seconds, and more preferably about 25 seconds. Then, the knitted component should reach a drying temperature of about 75-90 degrees Celsius for about 40-60 seconds, and more preferably about 50 seconds. The knitted component may then be cooled (to lock the knit loops or stitches) to or below about 30 degrees Celsius. The knitted component 132 may then be folded and/or manipulated into a three-dimensional structure that generally conform to the shape of an upper of an article of footwear. The knitted component may be placed on a last or other similar device such that the knitted component 132 is shaped and/or the first and second edges of the knitted component 132 are secured together at the seam 140.

Further, after steaming and/or heating (and shaping, if desired) the knitted component 132, the skin layer 152 may be applied to at least one portion of the knitted component 132 as desired and/or needed. In one non-limiting example, the skin may comprise a Duragon® skin, sourced from Teijin, Ltd. In one example, the skin layer may have a melting point of between about 110-120 degrees Celsius, and more particularly, 118 degrees Celsius. Then, at least a portion of, or the entirety of the knitted component 132 with the skin layer 152 arranged thereon may be subjected to a second temperature of heat at or above the melting temperature for a second period of time. For example, the upper (with the Duragon® skin layer applied) may be subjected to a pressure×time of 5.5×30 $kg/cm^2$×Sec. When subjected to this heat, the second thermoplastic polymer material present in the skin layer 152 may be at least partially melted or softened, such that the skin layer 152 is applied and/or adhered and/or fused to the knitted component 132.

This provides the ability for the skin layer 152 to bond or fuse different portions of the knitted component 132 together and/or secure other components (e.g., sole structure) to the knitted component 132 at desired and/or needed locations through thermal bonding. While steaming and heat-pressing processes are described herein, any other suitable process may be used to perform the thermal bonding process to apply the skin layer 152 to at least a portion of the knitted component 132.

Then the knitted component 132 with the skin layer 152 applied thereon may be cooled such that components (e.g., sole structure, images, elements, symbols, logos or other objects) may be secured to the knitted component 132 through the skin layer 152. Once cooled, any fused areas formed by the skin layer 152 may also enhance one or more mechanical properties of the knitted component 132 (such as strength, rigidity, stiffness, durability, and ability to retain shape) at least in select locations and/or have the effect of securing or locking the relative positions of the monofilament strands and/or yarns within the knitted component 132.

While the embodiments and other features are described generally herein with reference to an upper 102 for an article of footwear, those features could additionally or alternatively be incorporated into another type of article. For example, the features described herein may be included in articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats).

In the present disclosure, the ranges given either in absolute terms or in approximate terms are intended to encompass both, and any definitions used herein are intended to be clarifying and not limiting. Notwithstanding that, the numerical ranges and parameters setting forth the broad scope of the present embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the present disclosure encompasses any and all possible combinations of some or all of the various aspects described herein. It should also be understood that various changes and modifications to the aspects described herein will be apparent to those skilled in the art. Such changes and modifications can be made without departing from the spirit and scope of the present disclosure and without diminishing its intended advantages. It is therefore intended that such changes and modifications be covered by the appended claims.

We claim:

1. An upper for an article of footwear, the upper comprising:
a knitted component extending through a forefoot region, a midfoot region, and a heel region of the upper, wherein at least the forefoot region of the knitted component comprises a single layer half-gauge knit or lesser gauge knit formed from repeatedly alternating consecutive courses of a first monofilament and a second multifilament yarn, the second multifilament yarn having a tenacity of at least about 5 g per denier or greater.

2. The upper of claim 1, wherein the first monofilament comprises a co-extruded yarn with a nylon core and a thermoplastic polyurethane sheath.

3. The upper of claim 1, wherein the first monofilament has an approximate denier of about 350 and an average tensile strength of about 1.17 Kgf.

4. The upper of claim 1, wherein the lesser gauge knit comprises one of a quarter-gauge knit and a third-gauge knit, and wherein the single layer is a half-gauge or lesser gauge jersey knit.

5. The upper of claim 1, wherein the repeatedly alternating consecutive courses comprise a first course comprising at least one end of the second multifilament yarn and a second course comprising at least one end of the first monofilament.

6. The upper of claim 1, wherein the repeatedly alternating consecutive courses comprise a first course comprising at least two ends of the second multifilament yarn and a second course comprising at least one end of the first monofilament.

7. The upper of claim 1, wherein the repeatedly alternating consecutive courses comprise a first course comprising at least three ends of the second multifilament yarn and a second course comprising at least one end of the first monofilament.

8. The upper of claim 1, wherein the repeatedly alternating consecutive courses comprise a first course comprising three ends of the second multifilament yarn, a second course comprising two ends of the first monofilament, a third course comprising the three ends of the second multifilament yarn, and a fourth course comprising the two ends of the first monofilament.

9. The upper of claim 1, wherein the repeatedly alternating consecutive courses comprise a first course comprising three ends of the second multifilament yarn, a second course comprising one end of the first monofilament, a third course comprising the three ends of the second multifilament yarn, and a fourth course comprising two ends of the first monofilament.

10. The upper of claim 9, wherein the first monofilament or the second multifilament yarn is translucent or at least partially transparent so as to allow one or more images, elements, symbols, or logos to be visible from an exterior side of the upper.

11. The upper of claim 1, further comprising a skin layer disposed upon at least a portion of the upper and wherein the skin layer comprises a thermoplastic material.

12. An article of footwear comprising an upper and a sole structure secured to the upper, the upper comprising:
a knitted component extending through a forefoot region, a midfoot region, and a heel region of the article of footwear, wherein at least the forefoot region comprises a single layer half-gauge knit or lesser gauge knit formed from repeatedly alternating consecutive courses of a first monofilament and a second multifilament yarn, and wherein the knitted component comprises a basis weight of at least about 2 g to about 5 g per a 5 in.×5 in. swatch of the knitted component.

13. The article of footwear of claim 12, wherein the first monofilament comprises a co-extruded yarn with a nylon core and a thermoplastic polyurethane sheath.

14. The article of footwear of claim 12, wherein the first monofilament has an approximate denier of about 350 and an average tensile strength of about 1.17 Kgf.

15. The article of footwear of claim 12, wherein the forefoot region comprises the lesser gauge knit which comprises one of a quarter-gauge knit and a third-gauge knit.

16. The article of footwear of claim 12, wherein the repeatedly alternating consecutive courses comprise a first course comprising at least one end of the second multifilament yarn and a second course comprising at least one end of the first monofilament.

17. The article of footwear of claim 12, wherein the repeatedly alternating consecutive courses comprise a first course comprising at least two ends of the second multifilament yarn and a second course comprising at least one end of the first monofilament.

18. The article of footwear of claim 12, wherein the repeatedly alternating consecutive courses comprise a first course comprising at least three ends of the second multifilament yarn and a second course comprising at least one end of the first monofilament.

19. The article of footwear of claim 12, wherein the repeatedly alternating consecutive courses comprise a first course comprising three ends of the second multifilament yarn, a second course comprising two ends of the first monofilament, a third course comprising the three ends of the second multifilament yarn, and a fourth course comprising the two ends of the first monofilament.

20. The article of footwear of claim 12, wherein the repeatedly alternating consecutive courses comprise a first course comprising three ends of the second multifilament yarn, a second course comprising one end of the first monofilament, a third course comprising the three ends of the second multifilament yarn, and a fourth course comprising two ends of the first monofilament.

21. The article of footwear of claim 20, wherein the first monofilament or the second multifilament yarn is translucent or at least partially transparent to allow one or more images, elements, symbols, or logos to be visible from an exterior side of the upper.

22. The article of footwear of claim 12, wherein the second multifilament yarn has a tenacity of at least about 5 g per denier or greater.

23. The article of footwear of claim 12, further comprising a skin layer disposed upon at least a portion of the upper and wherein the skin layer comprises a thermoplastic material.

24. A method of forming an article of footwear, comprising:
on a single needle bed of a knitting machine, knitting a knitted component configured to form at least a forefoot region of an upper of the article of footwear, wherein the knitted component comprises a half-gauge knit or lesser gauge knit formed from repeatedly alternating consecutive courses of a first monofilament and a second multifilament yarn, wherein the second multifilament yarn has a tenacity of at least about 5 g per denier or greater;
securing the knitted component to a jig;

exposing the knitted component to a heat stimulus;
removing the knitted component from the jig;
manipulating the knitted component to form a shape of the upper of the article of footwear; and
applying a skin to at least a portion of the knitted component.

25. The method of claim 24, wherein exposing the knitted component to the heat stimulus comprises exposing the knitted component to a temperature in a first range of about 95 degrees Celsius to about 100 degrees Celsius for about 20 seconds to about 30 seconds; allowing the knitted component to reach a drying temperature in a second range of about 75 degrees Celsius to about 90 degrees Celsius for about 40 seconds to about 60 seconds and cooling the knitted component to or below about 30 degrees Celsius.

* * * * *